United States Patent [19]

Kelley

[11] 3,738,432
[45] June 12, 1973

[54] RIPPER PLOW ASSEMBLY FOR CONVERTING PARALLEL LIFT TO RADIAL LIFT

[76] Inventor: Leon O. Kelley, P. O. Box 488, Stamford, Tex. 79553

[22] Filed: May 24, 1971

[21] Appl. No.: 146,253

[52] U.S. Cl. ............... 172/248, 37/193, 172/484, 172/699
[51] Int. Cl. ............................................ A01b 13/08
[58] Field of Search ............. 37/98, 193; 172/699, 172/700, 248, 484; 61/72.6

[56] References Cited
UNITED STATES PATENTS

| | | | |
|---|---|---|---|
| 3,571,956 | 3/1971 | Heiberg | 37/98 |
| 3,050,135 | 8/1962 | Kelley | 172/699 X |
| 3,578,090 | 5/1971 | Cline | 172/699 X |
| 2,786,589 | 3/1957 | Garrett | 172/248 UX |
| 3,515,222 | 6/1970 | Kant | 61/72.6 X |
| 3,472,528 | 10/1969 | Richey et al. | 172/248 X |

FOREIGN PATENTS OR APPLICATIONS

| | | | |
|---|---|---|---|
| 1,009,091 | 11/1965 | Great Britain | 172/699 |
| 704,516 | 4/1966 | Italy | 172/699 |

*Primary Examiner*—Robert E. Pulfrey
*Assistant Examiner*—Clifford D. Crowder
*Attorney*—Richards, Harris & Hubbard

[57] ABSTRACT

A ripper plow assembly which includes a hitch frame for connection to the rear of a prime mover such as a tractor. A tool bar includes a pair of outwardly diverging arms each having end structure for connection to the hitch frame. A single fluid cylinder is pivotally connected to the hitch frame and includes a movable output shaft pivotally connected to the juncture of the arms of the hitch frame. A ripper shank support is connected to the rear end of the tool bar and includes a pair of upward extensions. The shank support may support either a single ripper shank or a plurality of ripper shanks arranged in a V-configuration. Two interconnected parallel linkage bars are connectable between the upper extensions of the shank support and the hitch frame to provide a parallelogram plow assembly. Alternatively, the linkage bars or a rigid plate may be connected between the upper extensions of the shank support and the tool bar to provide a radial plow assembly.

20 Claims, 13 Drawing Figures

PATENTED JUN 12 1973

INVENTOR
LEON O. KELLEY

Richards, Harris & Hubbard
ATTORNEYS

INVENTOR:
LEON O. KELLEY

INVENTOR:
LEON O. KELLEY

INVENTOR:
LEON O. KELLEY

INVENTOR:
LEON O. KELLEY

ATTORNEYS

INVENTOR
LEON O. KELLEY

RIPPER PLOW ASSEMBLY FOR CONVERTING PARALLEL LIFT TO RADIAL LIFT

FIELD OF THE INVENTION

This invention relates to ripper plows and more particularly relates to a ripper plow assembly which may be hydraulically raised and lowered and which may be connected to either a single ripper shank or to an array of ripper shanks, and which may be converted to either a parallelogram or a radial lift plow.

THE PRIOR ART

A number of various types of ripper plows which may be hydraulically raised and lowered have been heretofore developed. An example of such a ripper plow is described in U.S. Pat. No. 2,783,699, issued on Mar. 5, 1957 to C. O. Kelley and assigned to the present applicant. Such prior ripper plows have generally required at least two hydraulic motors for raising and lowering the plow assembly due to the size and weight of the plow assembly. Moreover, such previously developed ripper plows have generally utilized unitary tool bar and shank supporting assemblies, and thus have often not offered flexibility in changing the number and location of the ripper shanks. Previously developed ripper plow assemblies have often been unduly wide and bulky, and have often been somewhat difficult to draw in some environments, due to the fact that a plurality of the outer ripper shanks were mounted forward of the centrally located ripper shank. In addition, many previously developed ripper plow assemblies have severely changed the angle of penetration of the ripper shanks upon raising the plow from its normal lower plowing position.

In addition, ripper plows have generally been manufactured in a rigid configuration and have not been adaptable to alternate configurations. For example, plows are generally configured with a particular type of lift mechanism, and if a different type of lift mechanism is desired for use in certain cases, a different plow must be purchased. It is thus desirable to provide a modular plow assembly which may be configured in a parallelogram lift assembly, or alternatively into a radial plow assembly. Additionally, it is desirable to provide a plow wherein both the number and configuration of the ripper shanks may be varied to meet various operating needs.

SUMMARY OF THE INVENTION

In accordance with the present invention, a ripper plow assembly is provided which is lightweight and narrow, as well as having substantial structural strength. The present ripper plow assembly may be quickly and easily changed from a single ripper shank plow to a generally V-shaped ripper shank array. The ripper plow assembly of the present invention utilizes only a single centrally mounted hydraulic cylinder for raising and lowering the plow assembly. In one embodiment of the invention, a ripper shank array is provided with a central ripper shank mounted forward to pioneer the plowing operations. A parallelogram linkage may be provided on the present plow assembly whereby the angle of penetration of the ripper shanks is maintained generally constant during raising and lowering of the plow assembly. Alternatively, a radial lift linkage may be provided for the plow assembly.

In accordance with a more specific aspect of the present invention, a ripper plow assembly includes a frame for connection to a prime mover. A tool bar is connectable to the frame at the forward end thereof, the tool bar being wider at the forward end than at the rearward end. A fluid cylinder is pivotally supported by the frame and is operable to raise and lower the tool bar. A ripper shank assembly is connectable to the rearward end of the tool bar. A pair of parallel linkage bars are disposed above the tool bar on opposite sides of the fluid cylinder and are connected at the rearward ends thereof to the shank assembly and at the forward ends thereof to the frame.

In accordance with another aspect of the invention, a ripper plow assembly includes a frame for connection to a prime mover. A tool bar is connectable to the frame at the forward end thereof, the tool bar being wider at the forward end than at the rearward end. A single fluid cylinder is pivotally supported by the frame and is operable to raise and lower the tool bar. A ripper shank assembly is connectable to the rear end of the tool bar. A rigid member may be connected between the shank assembly and the tool bar to provide a radial plow lift assembly.

In accordance with another aspect of the invention, a ripper plow assembly includes a hitch frame for connection to a prime mover. A tool bar includes a pair of outwardly diverging arms each having end structure for connection to the hitch frame. A fluid pressure operated cylinder is pivotally connected to the hitch frame between the arms and includes a movable shaft pivotally connected to the juncture of the arms. A ripper shank support is connected to the rear end of the tool bar and includes a pair of upward extensions. At least one ripper shank may be rigidly attached within the shank support. A pair of spaced apart linkage bars may be connected between the upward extensions of the shank support and the hitch frame to form a parallelogram linkage configuration, or the linkage bars or a rigid plate may be connected between the shank support and the tool bar to provide a radial plow lift assembly.

In accordance with another aspect of the invention, a ripper plow includes a unitary tool bar having a narrow elongate rear body and a pair of arms outwardly diverging from the forward end thereof. A ripper shank assembly is pivotally connected to the end of the elongate rear body. A pair of parallel bars are disposed over the tool bar and are pivotally connected at the ends thereof to the ripper shank assembly. A hydraulic cylinder is mounted between the parallel linkage bars and includes a movable shaft connected at the lower end to the central region of the tool bar. The cylinder is operable to raise and lower the tool bar. The ripper shank assembly may comprise either a narrow assembly for supporting a single ripper shank or may comprise a generally triangular plate connected at the apex region to said tool bar for supporting a plurality of ripper shanks in a generally V-shaped array.

DESCRIPTION OF THE DRAWINGS

For a more complete understanding of the present invention and for further objects and advantages thereof, reference is now made to the following description taken in conjunction with the accompanying drawings, in which.

DESCRIPTION OF THE PREFERRED EMBODIMENTS

Figure 1:
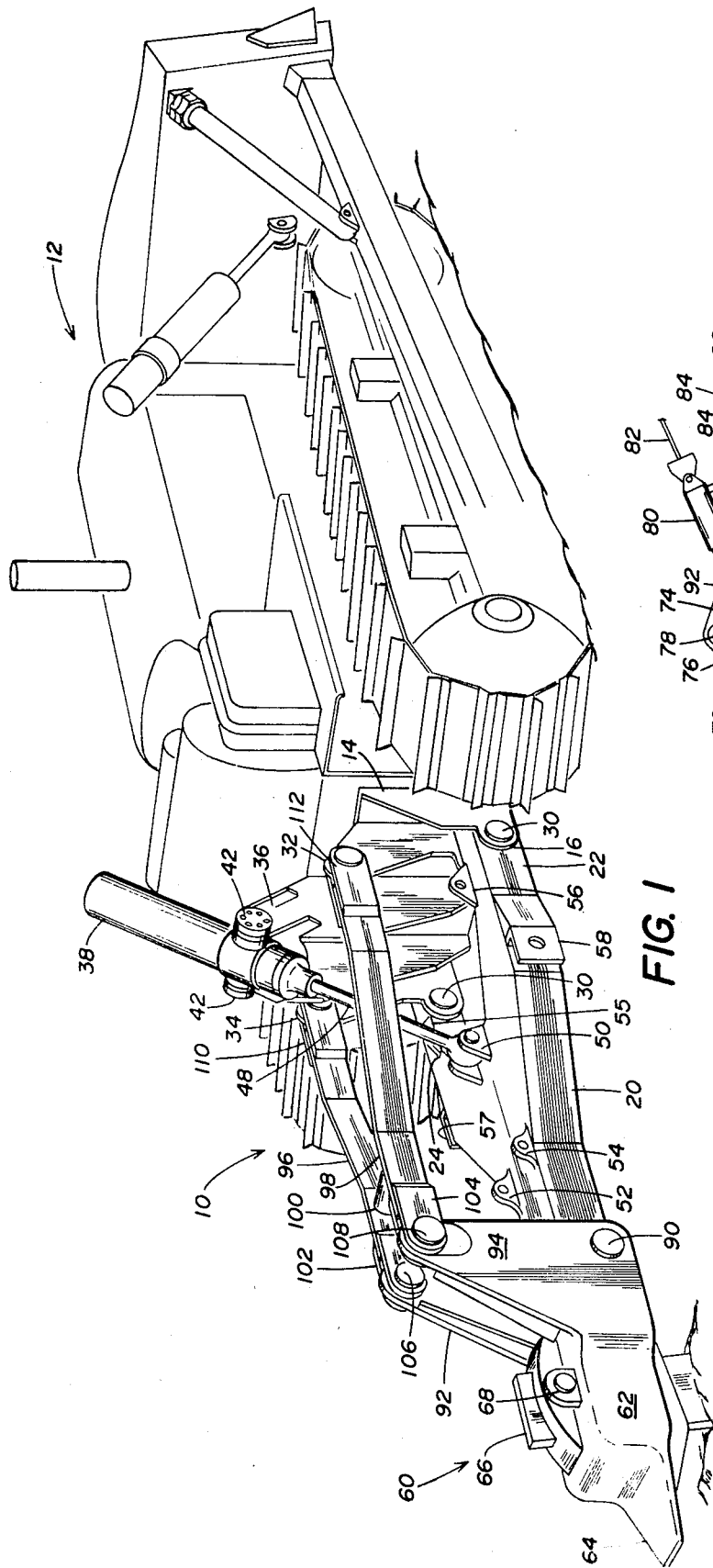
FIG. 1 illustrates a perspective view of the present ripper plow assembly connected in a parallelogram lift configuration and attached to a single ripper shank support.

Referring to FIGS. 1-4, the ripper plow assembly of the present invention is identified generally by the numeral 10. A prime mover 12 may comprise for example a caterpillar tractor or the like. An upstanding hitch frame 14 is rigidly connected to the rear of the prime mover 12, the frame 14 including a pair of spaced apart lug assemblies 16 and 18 (FIG. 3) at the lower end thereof.

A tool bar 20 includes a pair of outwardly diverging arms 22 and 24 having ears 26 and 28 at the forward ends thereof. Ear 26 is adapted to be received by the lug assembly 16, while ear 28 is adapted to be received between the lug assembly 18. Pins 30 are passed through apertures in the lug assemblies and the ears 26 and 28 to pivotally connect the tool bar 20 to the lower portion of the frame 14. The outwardly diverging arms 22 and 24 of the tool bar 20 form a generally V-shaped configuration, while the rearward end of the tool bar 20 is elongated and relatively narrow.

Figure 6:
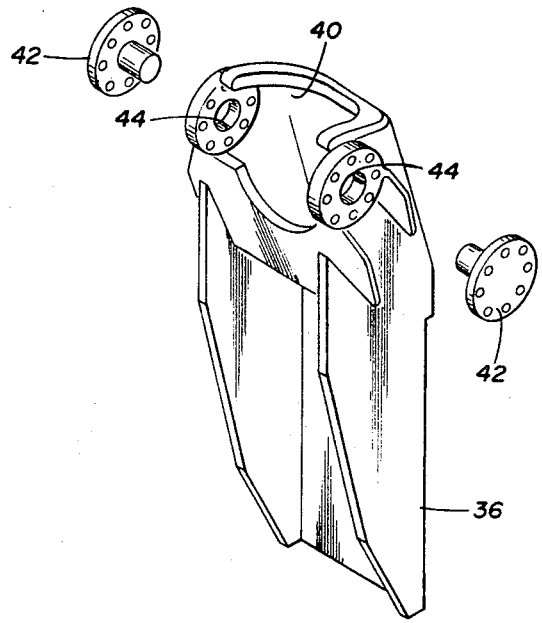
FIG. 6 is an exploded view of the hydraulic cylinder support of the invention.

A pair of lugs 32 and 34 extend rearwardly from and are rigidly connected to the upper part of the frame 14. Lugs 32 and 34 are disposed on opposite sides of an upwardly extending hydraulic cylinder support 36. As best shown in FIG. 6, the cylinder support 36 has a generally U-shaped cross section and is adapted to be rigidly connected to the hitch frame 14. The hydraulic cylinder 38 is pivotally mounted in an inclined position in an opening 40 in the upper portion of the support 36.

Trunnions 42 are adapted to extend through apertures 44 in the cylinder support 36 to pivotally connect the cylinder 38 within the cylinder support 36, as shown in FIGS. 1-4. Similar trunnion mountings for hydraulic cylinders are presently utilized in the commercially available KR-25D ripper plow manufactured and sold by the Kelley Products Division of CRC-Crose International, Inc. Hydraulic lines leading to the cylinder 38 have been omitted for clarity of illustration, but the hydraulic control system of the tractor is connected with the cylinder 38 for control thereof. The output shaft 48 from the hydraulic cylinder 38 is pivotally pinned at the lower end thereof between a lug assembly 50. Lug assembly 50 is rigidly interconnected at the juncture of the arms 22 and 24 of the tool bar 20.

A pair of lugs 52 and 54 are rigidly connected to the tool bar 20 and are utilized for connecting the plow assembly as a radial plow, in the manner to be later described with respect to FIGS. 12 and 13. A second pair of lugs 55 and 56 are also rigidly connected to the tool bar 20 for attachment to linkage bars to provide a radial plow in the manner later to be described with respect to FIGS. 10 and 11. Flanges 57 and 58 rigidly extend from the sides of the tool bar 20 for receiving lateral support bars in the manner to be subsequently described. Apertures are formed in flanges 57 and 58 for receiving pins for securing the support bars.

A ripper shank assembly 60 comprises a shank supporting housing 62 having a rearwardly extending push extension 64. A ripper plow shank 66 extends through an aperture in the housing 62 and is rigidly interconnected therewith by a pin 68. The plow shank 66 includes a number of apertures therethrough so that the position of the shank may be selectively adjusted within the housing 62.

Figure 2:
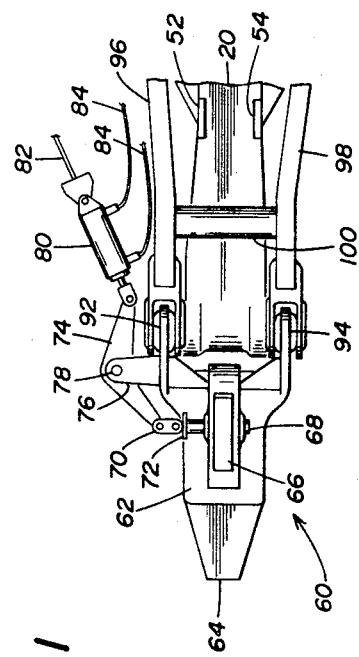
FIG. 2 illustrates a top view of a portion of the ripper plow assembly shown in FIG. 1 and illustrating a hydraulic pin pulling attachment.
Figure 3:
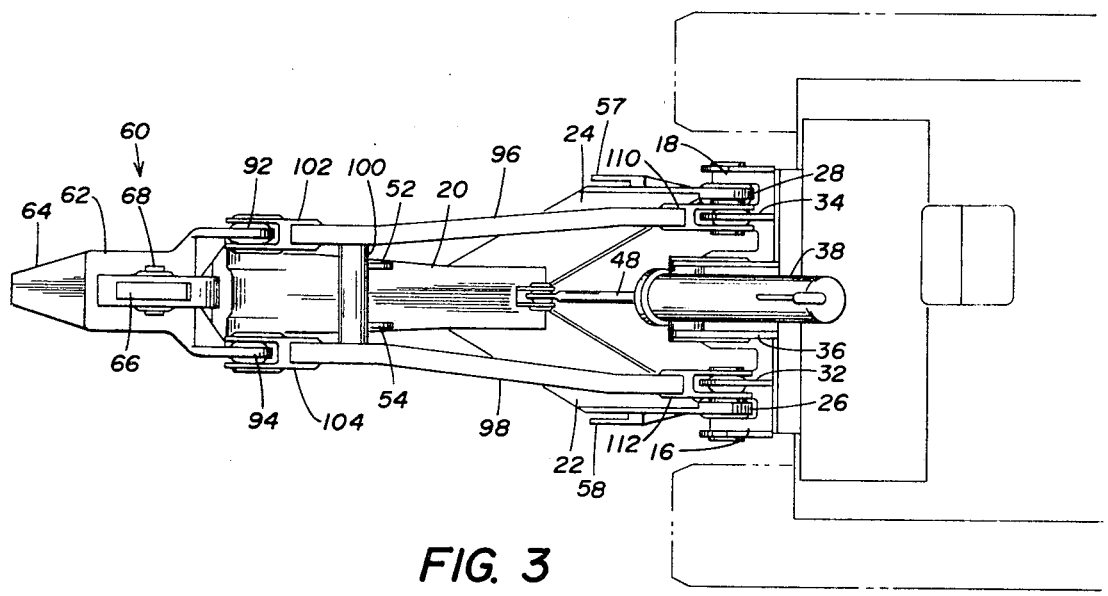
FIG. 3 is a top view of the ripper assembly shown in FIG. 1 with the pin pulling assembly omitted for clarity of illustration.
Figure 4:
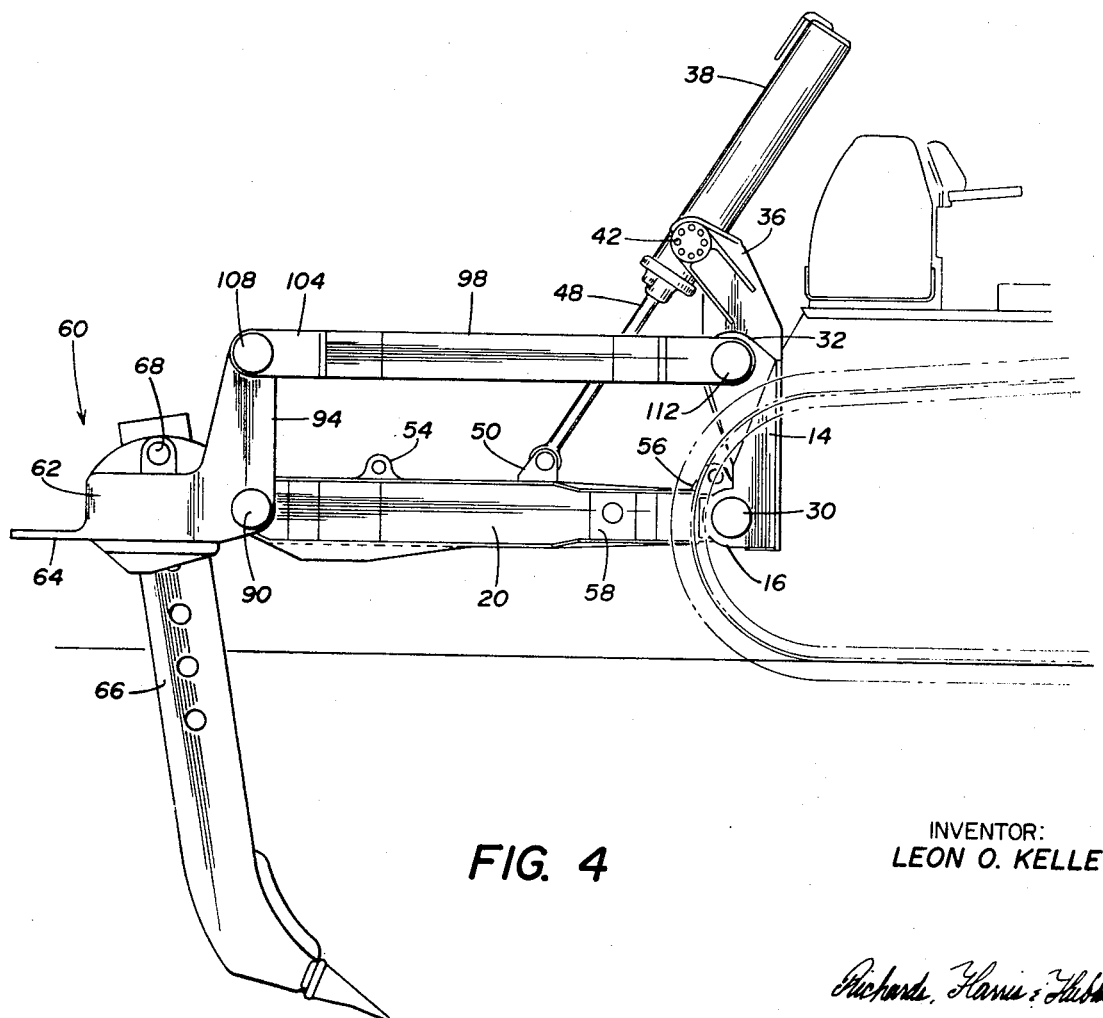
FIG. 4 is a side elevational view of a ripper plow assembly shown in FIG. 1.
Figure 5:
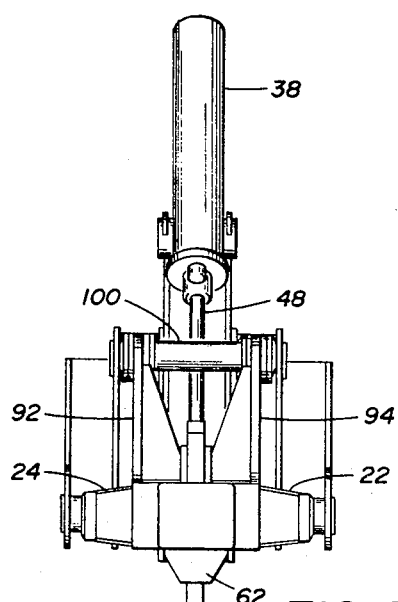
FIG. 5 is an end view of the ripper plow assembly shown in FIG. 1, with the prime mover omitted for clarity of illustration.

FIG. 2 illustrates the use of an automatic shank pin puller mechanism. A connection link 70 is connected to a support 72 connected with pin 68. A bell crank 74 is pivotally connected about an extension 76 by a bell crank pivot pin 78. The other end of the bell crank 78 is connected to a hydraulic cylinder 80 which is supported by a shaft 82 from the frame 14. Hydraulic fluid lines 84 are connected to the cylinder 80 and fluid may be supplied thereto in order to move the bell crank 74. Pivoting of the bell crank 78 automatically removes pin 68 to enable the position of the shank 66 to be adjusted. The automatic pin puller shown in FIG. 2 is omitted from the other FIGURES of the application for clarity of illustration.

The shank supporting housing 62 includes a yoke assembly which receives the rearward end of the tool bar 20 and is pivotally connected thereto by pins 90. The yoke assembly includes a pair of upstanding ears 92 and 94 which include apertures therethrough the upper ends. A pair of parallelogram linkage bars 96 and 98 are rigidly interconnected by a bar 100 and include lug assemblies 102 and 104 at the rearward ends thereof. Pins 106 and 108 may be inserted through the lug assemblies and through the apertures in the ears 92 and 94 to pivotally attach the ears 92 and 94 to the bars 96 and 98. Bars 96 and 98 include at the forward end thereof lug assemblies 110 and 112 which may be pivotally connected to lugs 32 and 34 by suitable pins. It will be understood that the parallelogram bar assembly may be unpinned and removed to enable interconnection of the plow in a radial plow lift configuration, as will be subsequently described. Alternatively, the parallelogram bar assembly may be repinned to the lugs 55 and 56 to provide a radial plow lift configuration.

As shown in FIGS. 1-5, the present plow assembly provides an extremely lightweight and relatively narrow plow for easy maneuverability, while yet providing an extremely rigid plow configuration. The present lightweight plow assembly may be lifted by operation of a single hydraulic cylinder 38, without the requirement of multiple lift hydraulic cylinders.

Figure 7:
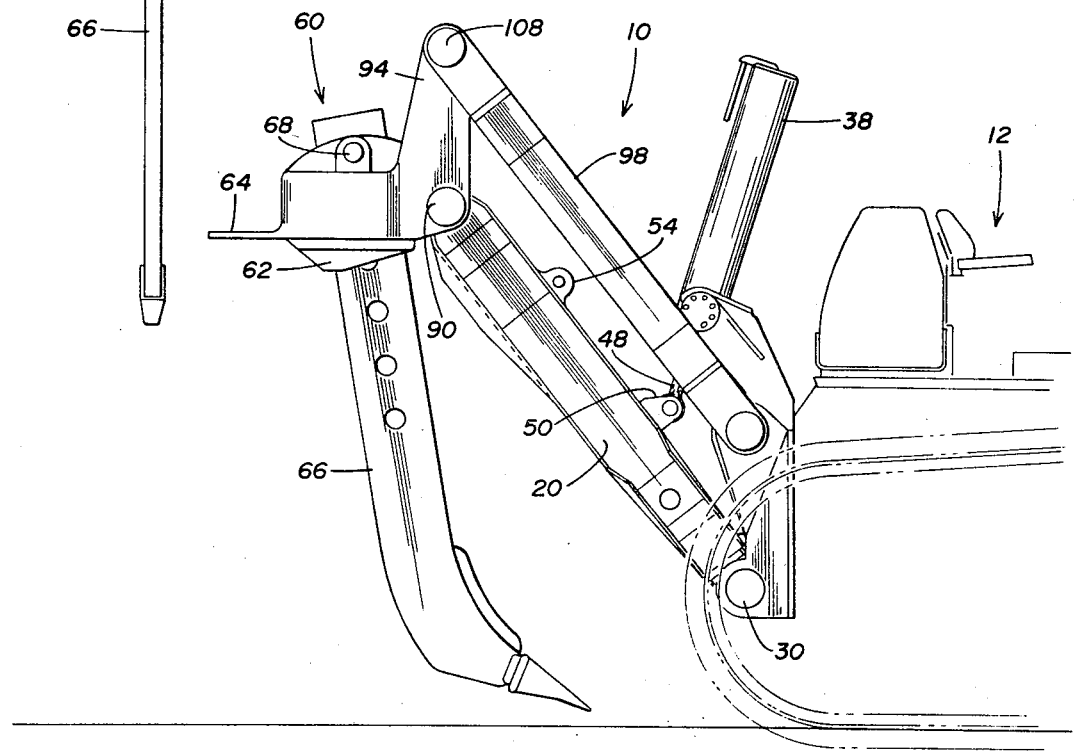
FIG. 7 is an elevational side view of the ripper plow assembly shown in FIG. 1 in a raised position.

FIG. 7 illustrates operation of the parallelogram lift structure of the present plow. Energization of the hydraulic cylinder 38 retracts the shaft 48, thereby pivoting the tool bar 20 upwardly about pins 30. The ripper shank assembly 60 is pivoted relative to the tool bar 20 about the axis of the pin 90. Due to the rigid nature of the bars 96 and 98, the upwardly extending ears 92 and 94 pivot relative to the bars 96 and 98 about the axis of the pins 106 and 108. Due to the parallelogram linkage of the present ripper plow, the shank 66 maintains substantially the same angle of penetration in the raised position as in the lowered position.

Figure 8:
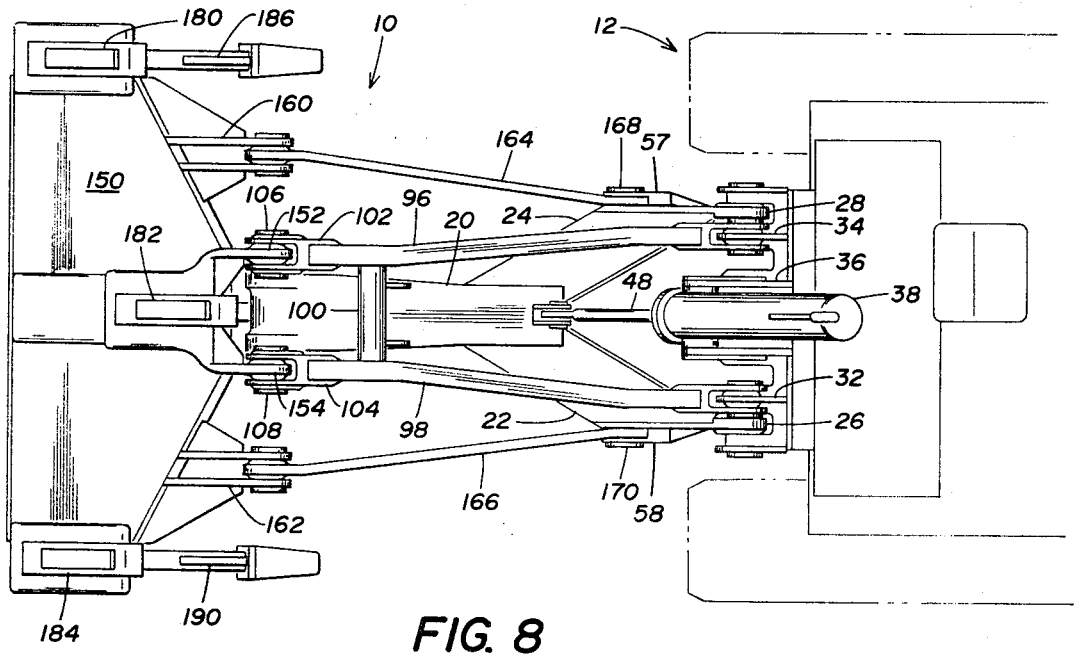
FIG. 8 is a top view of the ripper plow assembly of the invention illustrating the connection of a multiple ripper shank support structure.
Figure 9:
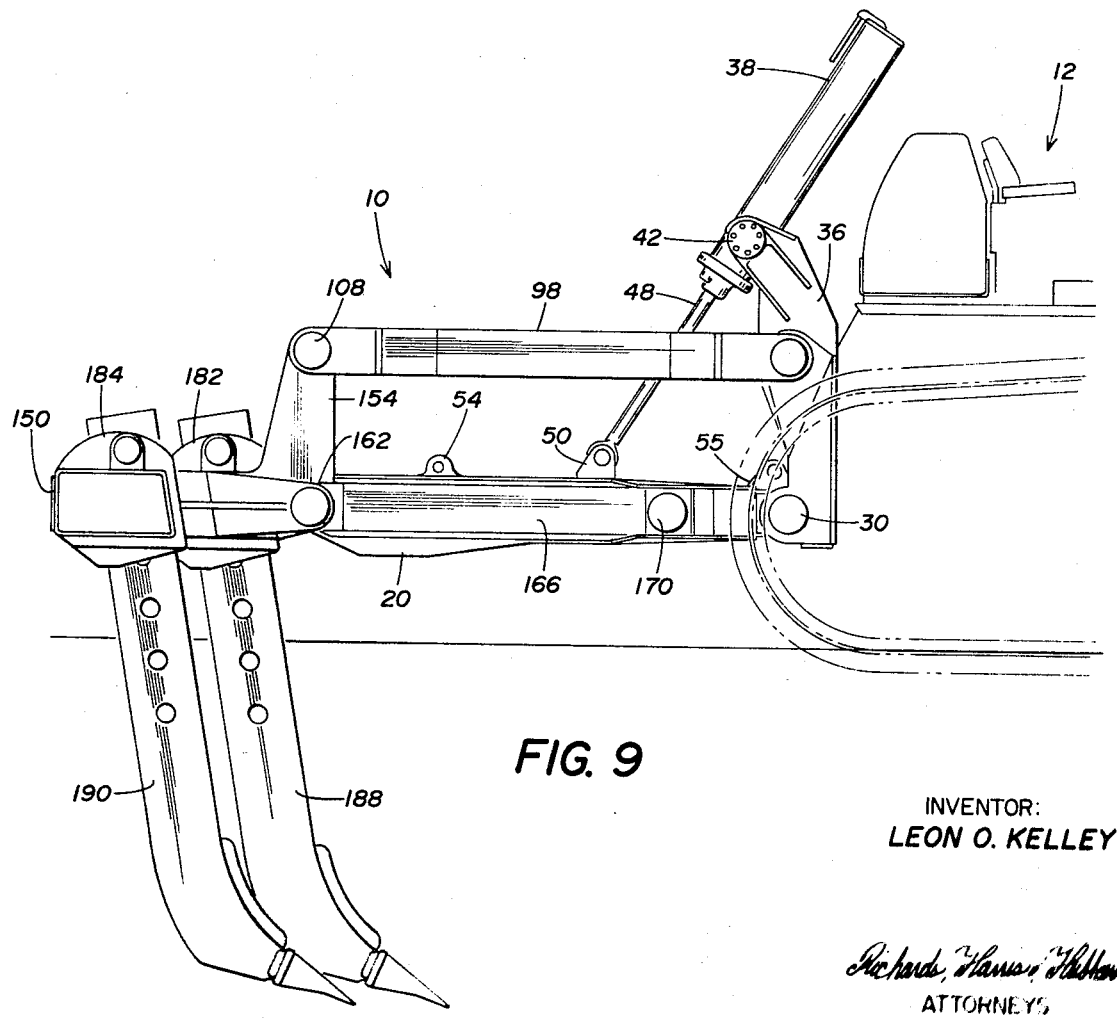
FIG. 9 is a side elevational view of the multiple ripper shank assembly shown in FIG. 8.

Referring to FIGS. 8 and 9, wherein like numbers are utilized for like and corresponding parts, structure is shown for converting the ripper plow shown in FIGS. 1-7 into a multi-shank configuration. The plow assembly shown in FIGS. 8 and 9 is identical to the assembly previously described with respect to FIGS. 1-7, with the exception that the single shank assembly has been removed by removing the pins 90, 106 and 108. The multiple shank support assembly 150 is then fitted against and pinned to the tool bar 20 in the manner shown. The shank support assembly 150 comprises a generally triangular plate including a yoke assembly which is adapted to be pinned to the rearward end of the tool bar 20. The yoke assembly includes upwardly extending ears 152 and 154 which are received by the lug assemblies 102 and 104 of the bars 96 and 98. Pins 106 and 108 pivotally connect the ears 152 and 154 with the paralelogram bars 96 and 98.

A pair of lug assemblies 160 and 162 extend forwardly from the support assembly 150 and are adapted to receive the rearward ends of lateral support bars 164 and 166, respectively. The forward ends of bars 164 and 166 are rigidly connected by bolts 168 and 170 between the flanges 57 and 58 of the tool bar 20. Bars 164 and 166 provide additional lateral stability required by the addition of plural ripper shanks.

Three shank housings 180, 182 and 184 are integrally connected to the shank support assembly 150 and rigidly support ripper shanks 186, 188 and 190 by means of pin connections in the conventional manner. The centrally located ripper shank 188 is positioned to lead or pioneer during plowing operations, to thereby provide lighter draft requirements during plowing. When the hydraulic cylinder 38 is actuated by the driver of the prime mover 12, the multiple shank assembly shown in FIGS. 8 and 9 is raised by the parallelogram linkage in a similar manner as that shown in FIG. 7. The present plow assembly is thus readily and easily converted from a single ripper shank plow to a multiple ripper shank plow configuration.

Figure 10:
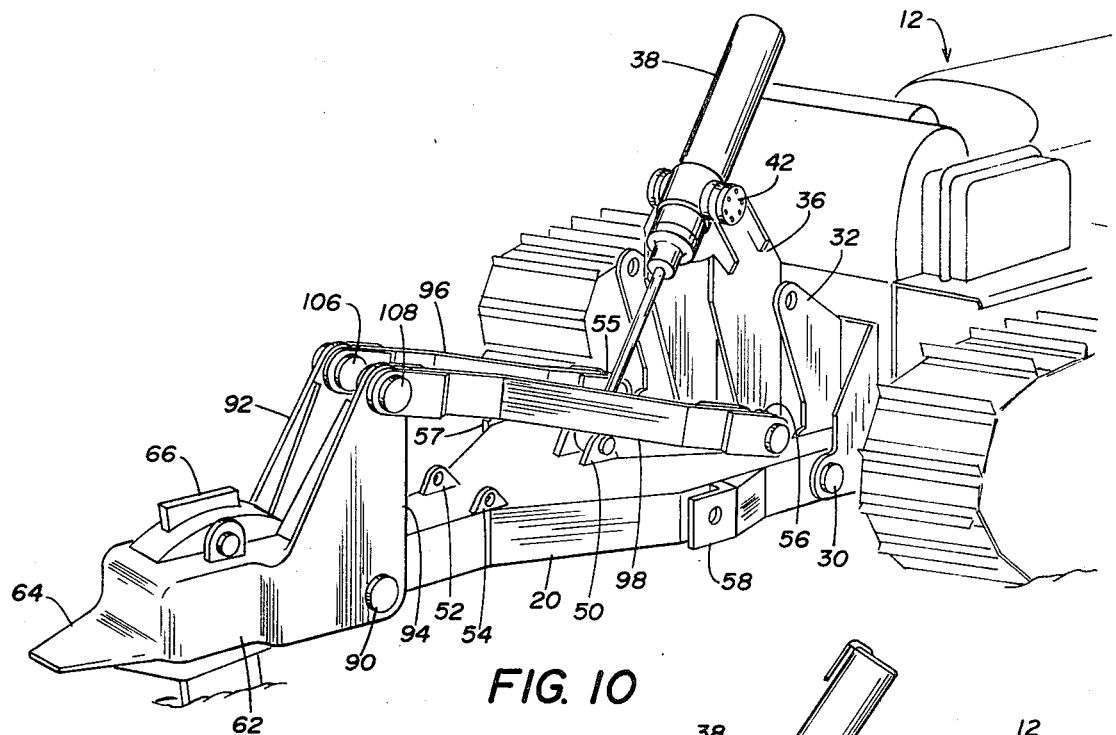
FIG. 10 is a perspective view of the ripper plow assembly with the linkage bars connected in a radial plow lift configuration.
Figure 11:
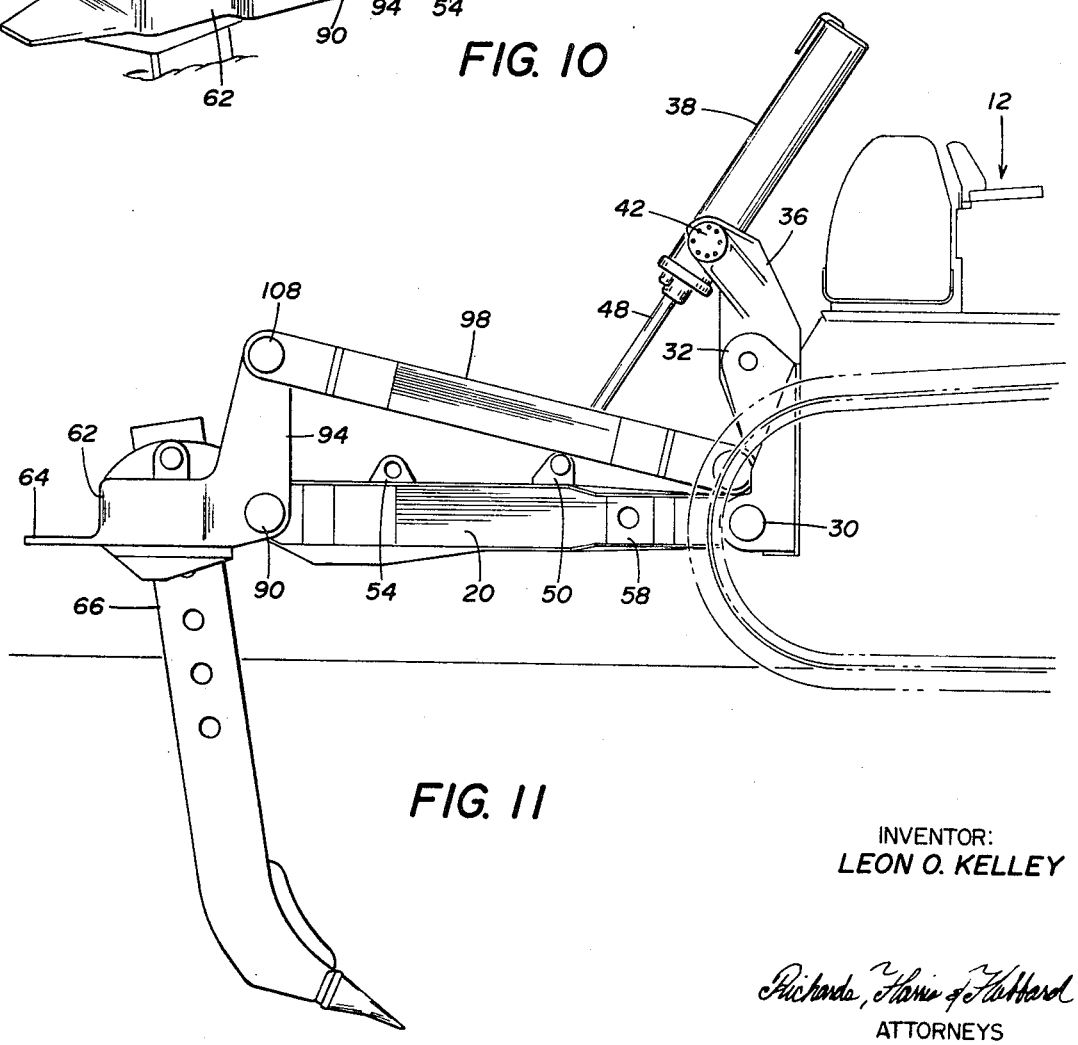
FIG. 11 illustrates an elevational side view of the radial plow shown in FIG. 10.

FIGS. 10 and 11 illustrate the conversion of the plow to a radial lift configuration by merely unpinning and reconnecting the forward ends of the parallelogram bar linkage to lugs 55 and 56. Lugs 55 and 56 are so disposed on the tool bar 20 to enable connection to the forward ends of the bars 96 and 98, wherein the housing 62 is not allowed to pivot relative to the tool bar 20 upon lifting of the plow. Thus, the present plow may be quickly converted either to a parallelogram or a radial plow lift configuration by the simple expedient of re-pinning the forward ends of bars 96 and 98.

Figure 12:
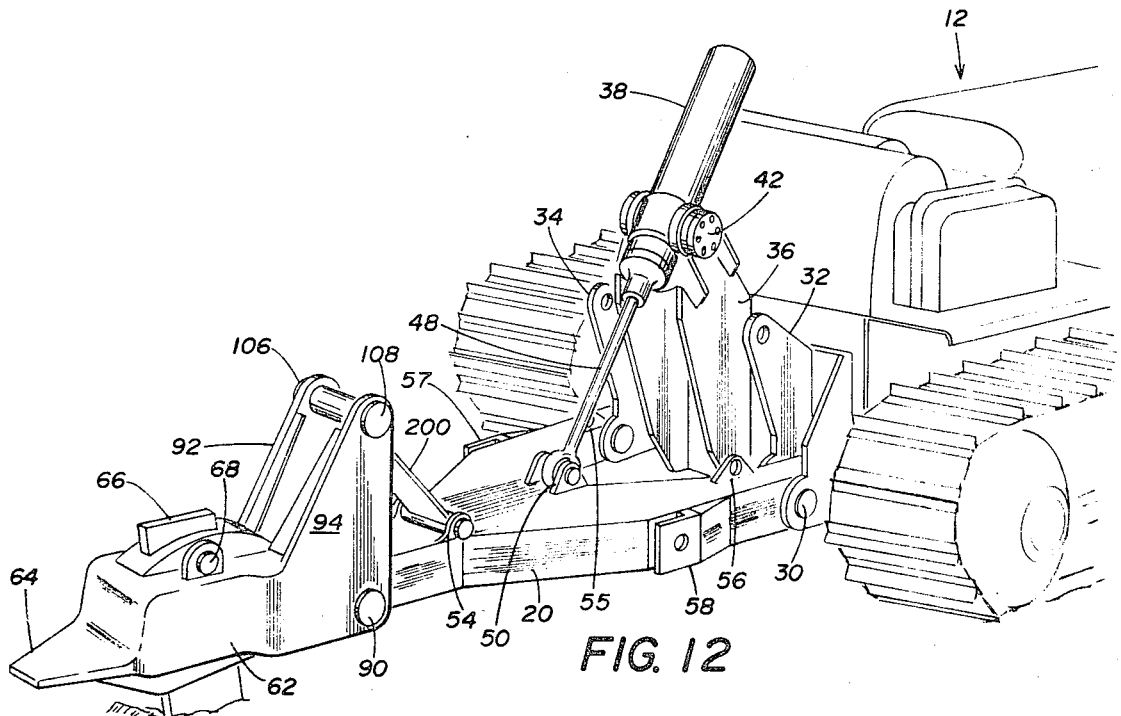
FIG. 12 is a perspective view of the ripper plow assembly connected in a radial plow lift configuration by the utilization of a rigid plate.
Figure 13:
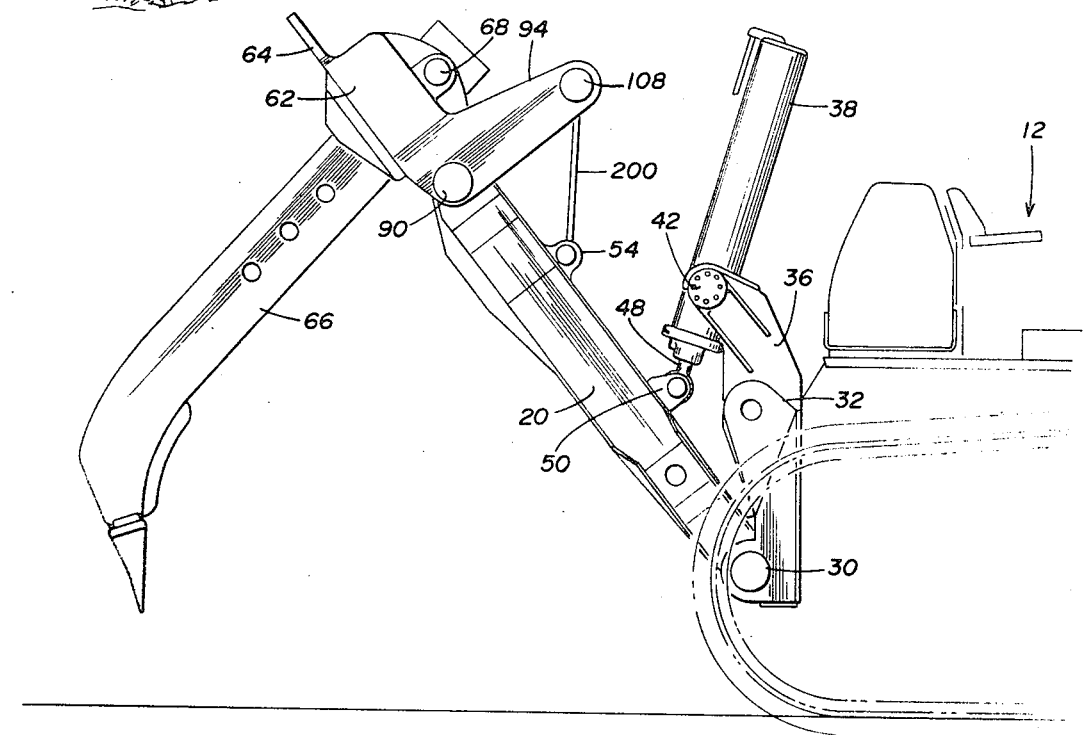
FIG. 13 is a side elevation view of the radial plow assembly shown in FIG. 12 in a raised position.

FIGS. 12 and 13 illustrate the conversion of the present plow into a radial plow lift configuration by the use of a rigid plate 200. The plow assembly shown in FIGS. 12 and 13 is identical to the assembly shown in FIG. 1, except that the parallelogram bar linkage has been removed and a radial plow brace plate 200 has been interconnected between the upper end of the ears 92 and 94 and the lugs 52 and 54. Brace plate 200 is comprised of rigid metal, and thus upon energization of the hydraulic cylinder 38, the housing 62 does not pivot respective to the tool bar 20. The plow is then raised in a radial manner as shown in FIG. 13.

It will be apparent that a number of advantages are provided by the present plow, including the easy conversion of the plow from a parallelogram lift linkage to a radial plow lift configuration. Although only a single shank plow assembly has been shown in FIGS. 10-13, it will be apparent that a multiple ripper shank assembly such as that shown in FIGS. 8 and 9 may be added to the radial plow. Upon the addition of the multiple ripper shank assembly, the lateral support bars 164 and 166 will be required to be connected to the plow in the manner previously described.

The present plow assembly is extremely flexible and may be configured alternatively as a single or multiple shank plow assembly, in combination with either a parallelogram or radial plow lift configuration. The present plow is lightweight and thus requires only a single hydraulic cylinder for providing lift thereto. If desired, an automatic pin puller arrangement may be utilized to facilitate adjustment of the ripper shanks. In the multiple ripper shank configuration, the center pioneering of the central ripper shank provides excellent plowing results with a relatively light draft requirement.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A ripper plow assembly comprising:
    a hitch frame adapted for connection to a prime mover,
    a tool bar having a forward end structure pivotally connected to said hitch frame and generally converging toward a rear end structure,
    a single lift cylinder having a rod and housing means, one of said rod and housing means being pivotally secured with said hitch frame and the other to said tool bar operable to raise and lower said tool bar,
    a ripper shank assembly pivotally connected to the rear end structure of said tool bar, said shank assembly having an upwardly extending yoke member,
    pivot means carried on said yoke member,
    linkage means for selectively interconnecting the pivot means of said yoke member to said hitch frame whereby actuation of said lift cylinder operates said plow assembly in a parallel lift configuration, and
    means on said tool bar to allow said shank assembly to be selectively fixed to said tool bar thereby permitting conversion of said plow assembly to a radial lift configuration.

2. The ripper plow assembly of claim 1 wherein said tool bar, yoke member, hitch frame and linkage means form said parallelogram configuration.

3. The ripper plow assembly of claim 1 wherein said last named means include flange means associated with said tool bar adapted to receive said linkage means to secure said linkage to said yoke member and tool bar.

4. The ripper plow assembly of claim 1 wherein said last named means comprise lug means associated with said tool bar adapted to receive a rigid connection plate attached to said yoke member.

5. The ripper plow assembly of claim 1 wherein said ripper shank assembly supports a single ripper shank.

6. The ripper plow assembly of claim 1 wherein said ripper shank assembly supports a plurality of ripper shanks arranged in a V-shaped array, one of said ripper shanks centrally and forwardly disposed at the apex of said V-shaped array.

7. The ripper plow assembly of claim 6 and further comprising:
lateral brace bars connected along opposite sides of said tool bar.

8. The ripper plow assembly of claim 1 wherein said lift cylinder is tilted upwardly and is inclined forwardly toward the prime mover, the rod of said lift cylinder inclined downwardly for connection to said tool bar.

9. The ripper plow assembly of claim 1 wherein said tool bar comprises a pair of outwardly diverging arms at the forward end thereof for connection to said hitch frame.

10. A ripper plow assembly comprising:
a hitch frame adapted for connection to a prime mover,
a tool bar including a pair of arms outwardly diverging and each having a forward end structure for pivotal connection to said hitch frame,
a fluid pressure operated cylinder having a rod and housing member, said housing member pivotally secured to said hitch frame between said arm end structures and said rod having an end pivotally connected to said tool bar intermediate said arms,
a ripper shank support pivotally connected to the rear end of said tool bar, said shank including a pair of upwardly extending ears,
at least one ripper shank adapted for connection to said shank support,
a pair of spaced apart linkage bars connectable between said ears and a forward portion of said plow assembly forming a parallelogram lift configuration, and
connection means carried on said tool bar adapted to selectively permit rigid connection of said tool bar and shank in a radial lift configuration.

11. The ripper plow assembly of claim 10 wherein said tool bar comprises:
an elongated body having structure at the rear end thereof for pivotal connection to said ripper shank support, and
said pair of arms extending from the forward end of said elongated body in a generally V-shaped configuration.

12. The ripper plow assembly of claim 10 wherein said ripper shank support includes a slot for receiving only a single ripper shank.

13. The ripper plow assembly of claim 10 wherein said ripper shank support includes plural slots for receiving plural ripper shanks in a generally V-shaped array.

14. The ripper plow assembly of claim 13 and further including lateral brace bars connected between said tool bar and said ripper shank support.

15. The ripper plow assembly of claim 10 wherein said cylinder is pivotally mounted in the center region of said hitch frame and is inclined upwardly, said rod being directed downwardly and connected at the lower end to said tool bar.

16. The ripper plow assembly of claim 10 and further comprising:
a shank pin for mounting said ripper shank to said shank support, and
hydraulically operable shank pin removing means.

17. The ripper plow assembly of claim 10 and further comprising:
a bar rigidly interconnecting said linkage bars.

18. The ripper plow assembly of claim 10 wherein said linkage bars are connected at the forward ends to said hitch frame.

19. The ripper plow assembly of claim 10 wherein said linkages bars are connected at the forward ends to said tool bar.

20. A ripper plow assembly comprising:
a hitch frame adapted for connection to a prime mover,
a tool bar having a pair of arms having forward end structure pivotally connected to said hitch frame and generally converging toward a rear end structure,
a single lift cylinder having a housing pivotally connected to said hitch frame between said arms end structures and having a rod end pivotally connected to said tool bar intermediate said arms operable to raise and lower the bar,
a ripper shank assembly having a yoke assembly pivotally secured to said rear end structure and a generally triangular plate structure connected at the apex region to said yoke, a plurality of ripper shanks being connected to the forward edge of said triangular plate in a V-shaped array,
lateral support bars connected to the forward edges of said triangular plate and being removably connected at the opposite ends thereof to the arms of said tool bar,
a pair of spaced apart linkage bars connected between said yoke and a forward portion of said plow assembly forming a parallelogram lift configuration, and
means carried on said tool bar adapted to selectively permit rigid connection of said tool bar and shank in a radial lift configuration.

* * * * *